United States Patent [19]

Upmeier et al.

[11] 4,339,404
[45] Jul. 13, 1982

[54] METHOD OF CONTROLLING THE FILM THICKNESS AT A BLOWN FILM INSTALLATION

[75] Inventors: Hartmut Upmeier; Gerd Klinge; Gerhard Winkler, all of Lengerich of Westphalia, Fed. Rep. of Germany

[73] Assignee: Windmöller & Hölscher, Lengerich of Westphalia, Fed. Rep. of Germany

[21] Appl. No.: 214,733

[22] Filed: Dec. 9, 1980

[30] Foreign Application Priority Data

Jan. 28, 1980 [DE] Fed. Rep. of Germany ....... 3002903

[51] Int. Cl.³ .......................................... B29D 23/04
[52] U.S. Cl. .................................. 264/40.1; 264/40.6; 264/40.7; 264/564; 425/141; 425/143; 425/144; 425/326.1; 425/381
[58] Field of Search .................. 264/40.1, 40.6, 40.7, 264/563-566, 40.3; 425/140-141, 143-144, 326.1, 72 R, 162-163, 325, 381

[56] References Cited

U.S. PATENT DOCUMENTS

| | | | |
|---|---|---|---|
| 3,307,215 | 3/1967 | Gerhard et al. | 425/162 |
| 3,510,374 | 5/1970 | Walker | 425/162 |
| 3,768,949 | 10/1973 | Upmeier | 425/325 |
| 3,775,035 | 11/1973 | Scotto et al. | 425/144 |
| 3,974,248 | 8/1976 | Atkinson | 425/162 |
| 4,189,288 | 2/1980 | Halter | 264/40.7 |
| 4,209,475 | 6/1980 | Herrington et al. | 264/40.6 |
| 4,246,212 | 1/1981 | Upmeier et al. | 264/40.7 |

FOREIGN PATENT DOCUMENTS

| | | |
|---|---|---|
| 2140194 | 6/1975 | Fed. Rep. of Germany . |
| 2658518 | 6/1978 | Fed. Rep. of Germany ..... 264/40.3 |
| 2723991 | 11/1978 | Fed. Rep. of Germany . |
| 2816583 | 10/1979 | Fed. Rep. of Germany . |

OTHER PUBLICATIONS

Article entitled "Prozessregler in der Extrusionstechnik", published 1976.
Article entitled "Möglickkeiten der Prozessbrechneranwendung bei Flachfolien-und Tafelextrusionsanlagen," published 1978.

*Primary Examiner*—Jeffery R. Thurlow
*Attorney, Agent, or Firm*—Fleit & Jacobson

[57] ABSTRACT

A nozzle ring of an extruder for blowing tubular plastics film is divided into cooling sectors provided with adjusting elements. The thicknesses of the blown film are measured over the circumference thereof and a number of film sectors of equal circumferential length corresponding to the number of cooling sectors is established from the measured thicknesses. Assuming that the film sector of maximum or minimum thickness has been extruded in the correct position for the purpose of determining the cooling sector associated with the film sector, the subsequent film sectors are in turn allocated to successive cooling sectors. From the measurements, the mean thickness distributions are determined over the individual film sectors. These values of mean thickness distribution define a measure for the correcting command for the adjusting elements of the cooling sectors that are associated with the respective film sectors.

10 Claims, 3 Drawing Figures

METHOD OF CONTROLLING THE FILM THICKNESS AT A BLOWN FILM INSTALLATION

The invention relates to a method of controlling the film thickness at a blown film extruder installation, comprising a nozzle ring divided into cooling sectors provided with setting elements and comprising a film calibrating device and a take-off and coiling apparatus for the film, wherein the film thicknesses are measured over the circumference of the extruded film and film sectors are formed corresponding to the number of correcting sectors defined by the cooling sectors, the film sector of maximum or minimum thickness is assumed to have been extruded in the correct position for determining the associated cooling sector at the nozzle ring and the subsequent film sectors are successively allocated to the subsequent cooling sectors, and wherein the temperature of the respective cooling sector at the nozzle ring is changed until the desired uniform thickness distribution has been achieved over the film circumference, according to U.S. patent application Ser. No. 209,060, filed Nov. 21, 1980.

In the method according to the cited application, the film sectors associated with the respective correcting sectors at the nozzle ring, i.e. those film sectors that were extruded from the associated correcting sectors of the nozzle ring, are determined over the circumference of the extruded film and, by way of the setting elements, the correcting sectors are so influenced depending on whether they extruded thick or thin portions that film sectors are obtained with equal circumferential lengths and thicknesses. According to the method of the parent patent, one can rapidly correct departures from the thickness tolerance of the film because there is a direct allocation of all thick and thin portions of the extruded film to the corresponding correcting sectors of the nozzle ring, so that one can act on the latter directly to set the film sectors with thick or thin portions to the mean film thickness.

Although the controlling method of the cited application can be defined algorithmically to permit one to employ microprocessors and microcomputers, this is relatively expensive.

Since the controlling method of the cited application calls for a considerable capacity for the microprocessor that is advantageously employed to perform the method, we have in U. S. patent application Ser. No. 214,732, filed Dec. 9, 1980, retained the basic concept of regarding the absolute tolerance thick portions and/or thin portions as having been extruded in the correct position but claimed a simplified controlling method of a kind such that only the principle of sector cooling or sector heating is employed and percentage threshold values are defined, only the peak departures from the tolerance that exceed this threshold value leading to a setting command. By progressively improving the thickness profile through a reduction in the extreme values of the tolerance departures this also produces a percentage reduction in the threshold value so that gradually one also acts on the adjoining lesser thin portions in the film (or thick portions) and the thick portions (or thin portions) are also gradually eliminated. The subject of the last cited application is therefore a simplified means for acting on the entire film tolerance range on the principle of sector cooling (or conversely of sector heating).

Whereas the first cited application the required high computer capacity is a disadvantage, the use of the threshold value according to the method of the last cited application brings the disadvantage that at any point only those individual correcting sectors are affected which are associated with film sectors of which the measuring values exceed the aforementioned threshold value. This can result in localised stressing at the nozzle ring which can detrimentally influence the course of the algorithmic control.

It is therefore the problem of the present invention to simplify the controlling method of the first cited application and thereby avoid marked one-sided cooling or heating at the nozzle ring.

According to the invention, this problem is solved in a method according to the first cited application in that film sectors of equal circumferential length are formed and from the measurements the mean thickness distributions are determined over the individual film sectors, and that the values of the mean thickness distributions define a measure for the correcting command for the setting elements of the cooling sectors that are associated with the respective film sectors. According to the method of the invention, therefore, several correcting or cooling sectors are influenced simultaneously corresponding to the measured tolerance departures of the individual film sectors, so that the control takes place more rapidly and more intensive one-sided heating or cooling of the nozzle ring is avoided.

According to a preferred embodiment of the invention, it is provided that the size of the correcting commands is so related to the film sector having the maximum or minimum thickness that the associated cooling sector receives no correcting command and the correcting commands of the other cooling sectors are formed by the respective departures of the mean thickness distributions of the associated film sectors from the extreme reference value of the mean thickness distribution, and that by reason of the correcting commands and according to the departure the cooling sectors are cooled when the extreme reference value is a maximum thickness or the cooling sectors are heated when the extreme reference value is a minimum thickness. Desirably, one starts with the control of the film sector with the minimum thickness because one can assume that this was most likely extruded from the associated cooling sector at the nozzle ring in the correct position, i.e. without lateral displacement by the different thickness distributions over the film circumference. Even if the subsequent film sectors have not been entirely correctly allocated to the subsequent cooling sectors, the displaced film sectors are pulled towards the correct positions associated with the respective cooling sectors in which the control results in elimination of the thin portions. However, with an elimination of the thin portions the thick portions are likewise progressively reduced and in the end one obtains a thickness profile which, as a result of the control, substantially corresponds to the mean thickness.

The same result is substantially achieved if one starts with the processing of the maximum thickness by means of additional heating.

According to a particularly advantageous embodiment of the invention, it is provided that the size of the correcting commands relatively to the departures substantially for all the cooling sectors associated with film sectors of which the mean thickness distributions are below the mean film thickness increases over-proportionally up to the cooling sector corresponding to the film sector with a thickness distribution corresponding to the mean film thickness and, substantially beginning with this cooling sector, increases under-proportionally for the cooling sectors associated with film sectors with thickness distributions over the mean film thickness. By means of this form of the invention one ensures that the extreme values of the tolerance departures on commencement of control are particularly intensively reduced so that a thickness profile corresponding to the mean thickness is very rapidly obtained. With the reduction in the extreme values, the over-proportionally large control commands also recede until substantially uniform temperature conditions obtain after setting a thickness profile corresponding to the mean thickness.

Desirably, the size of the correcting commands relatively to the departures increases substantially in the form of an e function. The e function will then intersect the line of proportionality substantially in the region of the mean film thickness.

Since a considerably more uniform thickness profile is already achieved after several measuring and control cycles of the aforementioned kind, further control can be continued by a simplified method. In a development of the invention it is therefore provided that after a few measuring and control cycles which are in each case obtained from one revolution of the measuring equipment over the circumference of the film, the differences detected from subsequent measurements in the mean thickness distributions of the individual film sectors are subtracted from or added to the mean film thickness of the previously determined departures and that the values so formed define a new measure for the correcting commands.

The controlling method of the invention can also be conducted so that the value of the thickness distribution corresponding to the mean film thickness is subtracted from the values of the mean thickness distributions for the individual film sectors and this difference defines a measure for the correcting command. In this embodiment, the control is not related to an extreme value but to the mean film thickness.

In this control method the cooling sectors associated with the film sectors having thin portions can be cooled at the same time as the cooling sectors associated with the film sectors having thick portions are heated.

One example of the invention will now be described in more detail with reference to the drawing, wherein.

Figure 1:
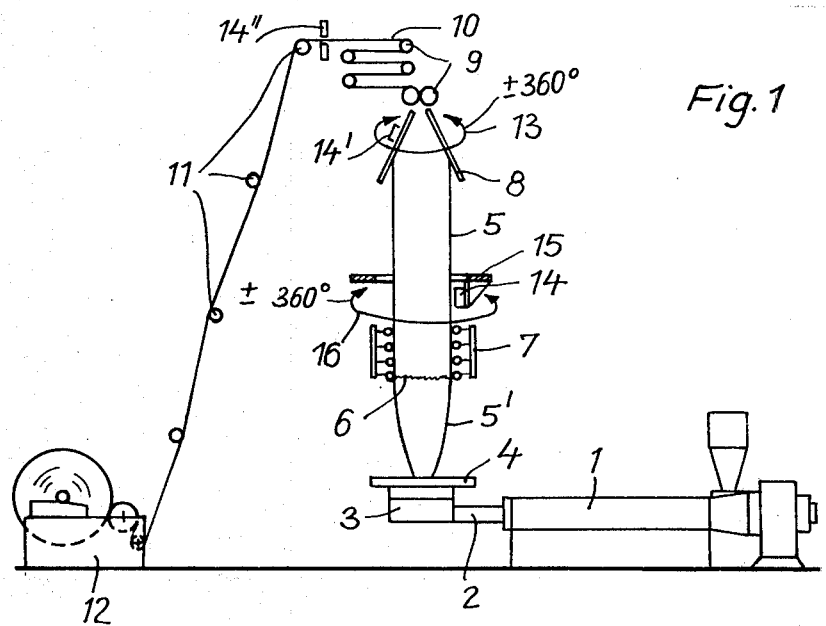
FIG. 1 is a diagrammatic side elevation of a blown film installation with equipment for detecting the thickness tolerances.
Figure 2:
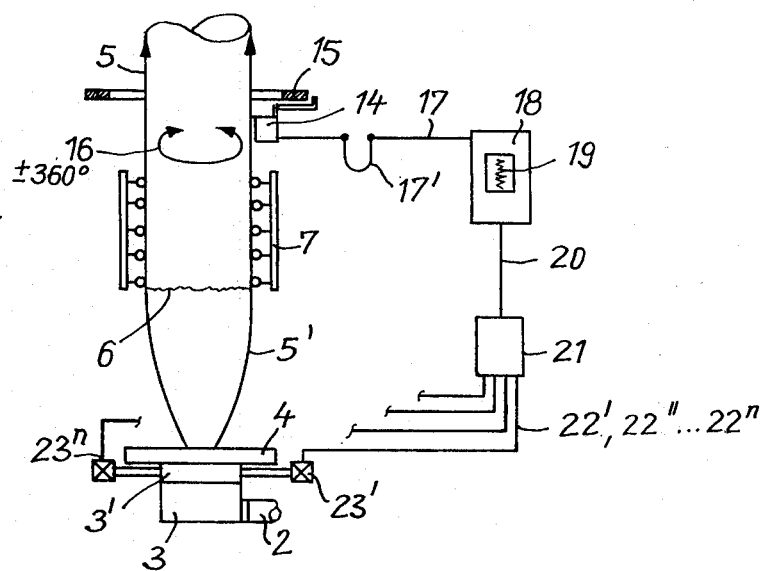
FIG. 2 is a diagrammatic representation of the relationship between the thickness measuring apparatus and the setting elements of the cooling sectors at the nozzle ring.

In the installation diagrammatically illustrated in FIG. 1, the extruder 1 conveys the thermoplastic melt to be processed through the connector 2 into the film blowhead 3 with the cooling ring 4, where the melt is formed into the tubular film 5. At the level of the rigidification line 6 of the film there is a diagrammatically indicated film calibrating apparatus 7 which determines the diameter of the tubular film and thus the width of the flattened web of film. The tubular film is flattened by means of the flattening plates 8, withdrawn by the take-off rollers 9 and the subsequent reversing rollers and fed as a flattened web 10 of film by way of the guide rollers 11 to the stationary coiler 12 and wound up.

Preferably above the calibrating apparatus 7, the measuring head 14 is disposed on an annular cross-member 15, the arrow 16 indicating the measuring motion through ±360°. To prevent the measuring result from being influenced by twist in the film resulting from the reversing take-off, the reversing motion is stopped shortly before or during the measurement. This interruption of the reversing rotation is acceptable because the reversing speed 16 of the measuring turntable 14, 15 is a multiple of the reversing speed 13 of the reversing take-off apparatus 8, 9. To measure the thickness tolerance profile, the reversing motion of the take-off 8, 9 is momentarily stopped and, after a short holding time which can be larger or smaller depending on the take-off speed of the film and which serves to reduce the angle of twist of the film bubble, the measuring turntable 14, 15 is rotated. Thereafter, the reversing take-off apparatus 8, 9 is restarted. By means of this interruption in the reversing take-off, the quality of coiling does not markedly deteriorate because, on approach of the film thickness tolerances towards zero, one could dispense with the reversing take-off for distributing the thick and thin portions of the film.

A measuring apparatus 14 determining the single film thickness can for example also be disposed in one of the flattening plates 8 at the position 14' or behind the reversing take-off apparatus 9 at a marginal zone of the flattened web 10 of film as a measuring system 14". In the latter case, one measures the double film thickness which can with sufficient accuracy be utilized as the thickness measurement for the single layer of web. The measuring signal of the rotary measuring head 14 is fed by way of the measuring conduit 17 with the cable loop 17' permitting the reversing motion to the thickness profile indicating box 18 and it is represented on the thickness tolerance diagram 19.

The thickness measurement signal can be fed as an electrical value by way of the connecting conduit 20 to a microprocessor 21 which suitably transforms the measuring signals and feeds the setting commands to the setting elements $23' \ldots 23^n$ for the cooling sectors by way of the connecting conduits $22', 22'' \ldots 22^n$.

Figure 3:
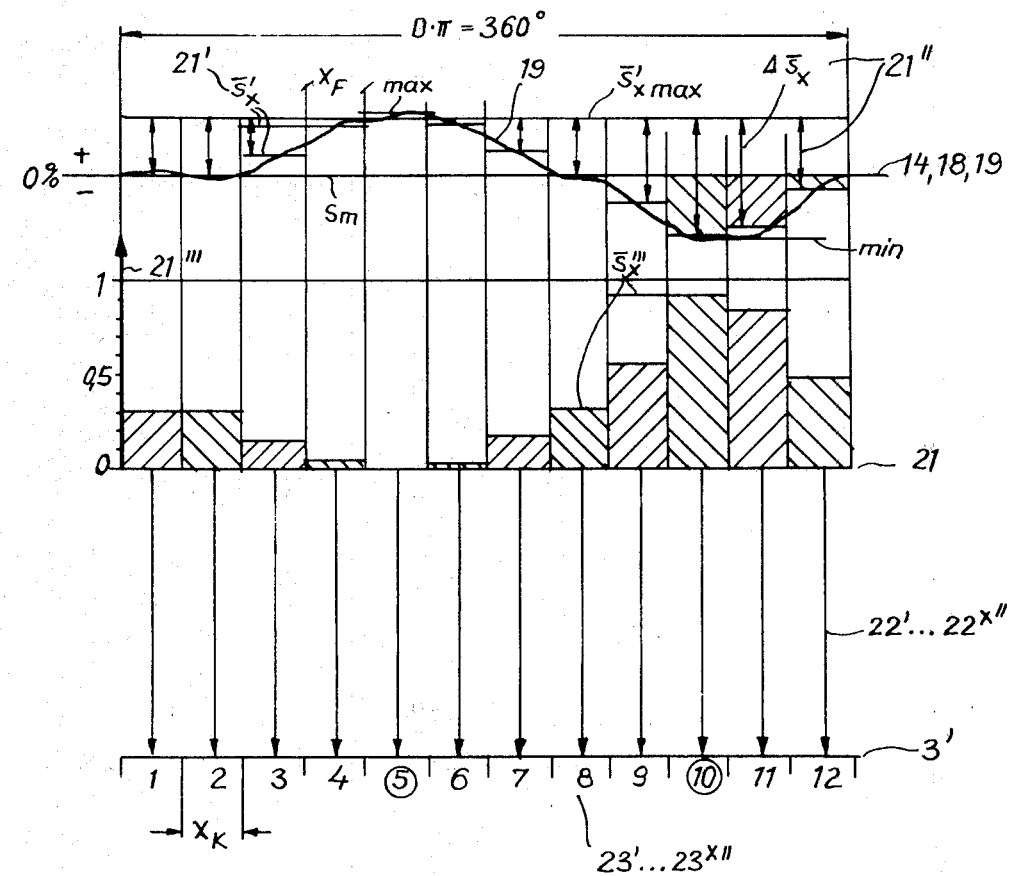
FIG. 3 is a quantitative representation of the allocation of the individual film sectors to the cooling sectors at the nozzle ring.

After one revolution of the measuring turntable 14, 15, film sectors $x_F$ are divided off corresponding to the number of cooling sectors $x_K$ and the partial mean values $\bar{s}_x'$ are formed. The values $\bar{s}_x'$ are stored in the measuring value memory 21' of the microprocessor 21. By means of the central unit (CPU) of the microprocessor 21, these partial mean values $\bar{s}_x'$ are related to the line of which the spacing from the 0% line or $s_m$ line, i.e. the line corresponding to the mean film diameter, is formed by the value $\bar{s}_{xmax}'$. In FIG. 3, this applies to the correcting sector 5 which has been emphasized by a circle. By means of the microprocessor 21, one then forms the difference $\Delta\bar{s}_x = \bar{s}_{xmax}' - \bar{s}_x'$ and stored in the operating memory of the microprocessor. In the operating memory of the microprocessor, these values likewise represent the course of the tolerance curve 19 of the thickness profle in step form according to the inverse of the partial mean values. One therefore obtains a profile which is related to an 0 line and which defines the starting point for determining the correcting commands for the setting elements.

By means of the microprocessor 21, the differences $\Delta\bar{s}_x$ are increased over-proportionally at the positions $\bar{s}_x' < s_m$ and are under-proportionally transformed at the thick positions with $\bar{s}_x' > s_m$. These values are stored in the operating memory of the microprocessor 21 as recalculated partial mean values $\bar{s}_x''$ and, after the first measuring cycle, transmitted as setting commands directly to the correcting or cooling sectors associated with the corresponding film sectors. Each measuring cycle is defined by the revolution of the measuring turntable 14, 15.

The cooling sector 5 associated with the film sector having the absolute thick position thus receives no cooling command whereas the cooling sector 10 associated with the film sector having the absolute thin tolerance position receives the largest cooling command.

The turning time of the measuring turntable 14, 15 results in a certain time constant so that it is desirable after several measuring and control cycles, i.e. after a plurality of revolutions of the measuring turntable, to adapt the controlling method to the thickness tolerance profile that has already been improved. For this purpose the thickness tolerance departures are no longer related to the extreme values but to the mean value line (0% or $s_m$) and the tolerance departures that are now still detected are added to or subtracted from the operating memory in the form of small correcting steps. Without any complicated algorithmic control, one thus obtains a quasi constant control behaviour which receives its measured time constant from the turning time of the measuring turntable.

Thus, by defining the reference line through the measuring sector with the maximum tolerance, the entire tolerance range is directly affected under the principle of sector cooling and it is brought to zero in a few steps. Conversely to the previously described method, one can also employ only sector heating and define the reference line to the sector having the minimum tolerance. Similarly, a combination of these two methods can be employed in that as a reference line the measuring values $\bar{s}_x'$ are related to the mean value $s_m$ even during the first revolution of the measuring turntable, the partial mean values being over-proportionally converted at the thin tolerance positions and under-proportionally converted at the thick positions and transferred to the operating memory $\bar{s}_x'''$. Particularly in the latter method, use is made either of the principle of heating-/cooling sectors or setting apparatuses actuated by gear motors.

The controlling method does not consider the lateral displacement of the intermediate measuring sectors relatively to the thin or thick positions; however, by reversal of the tolerance profile in the operating memory $\bar{s}_x'''$, one already achieves the final position of the tempering or correcting sectors $x_K$ during the first method step with a very good accuracy because the following revolutions of the measuring turntable with the resulting small correcting steps rapidly bring the resulting measuring value departure to zero in steps. In this respect it should be borne in mind that with thickness tolerances near 0% the measuring sectors $x_F$ are increasingly more correctly disposed in relation to the correcting sectors $x_K$.

We claim:

1. A method of controlling the film thickness at a blown film extruder installation, the installation comprising a nozzle ring for extruding film divided into cooling sectors provided with setting elements, a film calibrating device, and a take-off and coiling apparatus for the film, said method comprising:

measuring thicknesses over the circumference of the extruded film;

forming film sectors of equal circumferential length corresponding to the number of cooling sectors and assigning the film sectors to respective ones of the cooling sectors;

assigning the individual measured thicknesses to the film sectors and determining mean thickness distributions ($\bar{s}'_x$) for the individual film sectors, the values of the mean thickness distributions ($\bar{s}'_x$) defining a measure for correcting commands for the setting elements of the cooling sectors that are associated with the respective film sectors;

selecting one of the mean thickness distributions of one of the film sectors as a reference value ($\bar{s}'_{x\,max}$); and simultaneously generating correcting commands that influence the cooling sectors associated with remaining ones of the film sectors so that the values of the mean thickness distributions of the remaining film sectors approach the reference value to thereby obtain uniform thickness of the extruded film, the size of the correcting commands being so related to the film sector having the selected reference value that the cooling sector associated therewith receives no correcting command and the correcting commands of the other cooling sectors are formed by the respective departure ($\Delta \bar{s}_x$) of the mean thickness distribution of the associated film sectors from the extreme reference value of the mean thickness distribution ($\Delta \bar{s}_x = \bar{s}'_{x\,max} - \bar{s}'_x$), and that by reason of the correcting commands and according to the departure ($\Delta \bar{s}_x$), the cooling sectors are cooled when the reference value is a maximum thickness and the cooling sectors are heated when the reference value is a minimum thickness.

2. A method according to claim 1, characterised in that the size of the correcting commands relatively to the departures substantially for all cooling sectors associated with film sectors of which the mean thickness distributions are below the mean film thickness increase over-proportionally up to the cooling sector corresponding to the film sector with a thickness distribution corresponding to the mean film thickness ($s_m$) and, substantially beginning with this cooling sector, increases under-proportionally for the cooling sectors associated with film sectors with thickness distributions over the mean film thickness.

3. A method according to claim 2, characterised in that the size of the correcting commands relatively to the departures increases substantially in the form of an e function.

4. A method according to one of claim 1, characterised in that after a few measuring and control cycles the differences detected from subsequent measurements in the mean thickness distribution of the individual film sectors are subtracted from or added to the mean film thickness of the previously determined departures ($\Delta \bar{s}_x$), and that the values so formed define a new measure for the correcting command.

5. A method according to claim 1, characterised in that the value of the thickness distribution corresponding to the mean film thickness is subtracted from the values of the mean thickness distributions for the individual film sectors and this difference defines a measure for the correcting command.

6. A method according to claim 5, characterised in that the cooling sectors associated with the film sectors having thin portions are cooled at the same time as the cooling sectors associated with the film sectors having thick portions are heated.

7. A method according to claim 1, characterised in that the size of the correcting commands relatively to the departures increases substantially in the form of an e function.

8. A method according to claim 1, wherein the reference value is an extreme value representative of maximum thickness.

9. A method according to claim 1, wherein the reference value is an extreme value representative of minimum thickness.

10. A method according to claim 1, wherein the reference value is a value intermediate the maximum thickness and the minimum thickness of the extruded film.

* * * * *